United States Patent [19]
Gordon et al.

[11] Patent Number: 5,884,867
[45] Date of Patent: Mar. 23, 1999

[54] STABILIZING APPARATUS

[75] Inventors: Tal Gordon, Hod Hasharon; Dan Omry, Herzliya, both of Israel

[73] Assignee: Guidex, Ltd., Ramat Gan, Israel

[21] Appl. No.: 631,216

[22] Filed: Apr. 12, 1996

[30] Foreign Application Priority Data

Apr. 19, 1995 [IL] Israel ........................................ 113425

[51] Int. Cl.$^6$ .................................................. B64D 17/00
[52] U.S. Cl. ..................... 244/152; 244/138 R; 244/1 R; 396/12
[58] Field of Search ............................... 244/138 R, 142, 244/145, 152, 127, 32, 1 R; 396/12

[56] References Cited

U.S. PATENT DOCUMENTS

| | | | |
|---|---|---|---|
| 894,348 | 7/1908 | Seele | ........................................ 396/12 |
| 894,398 | 7/1908 | Rouse . | |
| 1,953,304 | 4/1934 | Lutz | ........................................ 396/12 |
| 2,492,501 | 12/1949 | Robins . | |
| 2,509,496 | 5/1950 | Hart . | |
| 3,006,584 | 10/1961 | Yost | ........................................ 244/127 |
| 3,121,377 | 2/1964 | Barbera . | |
| 3,146,975 | 9/1964 | Delamaire . | |
| 3,146,976 | 9/1964 | Houdou . | |
| 3,184,846 | 5/1965 | Flink . | |
| 3,240,139 | 3/1966 | Madden | ...................................... 396/12 |
| 3,386,692 | 6/1968 | Schuerch . | |
| 3,387,805 | 6/1968 | Barnett et al. . | |
| 3,514,058 | 5/1970 | Sloan, Jr. et al. | ........................ 244/138 |
| 3,698,667 | 10/1972 | Studenick et al. | ......................... 244/32 |
| 3,866,858 | 2/1975 | Rattenberry | ................................ 244/32 |
| 5,034,759 | 7/1991 | Watson | .................................... 244/127 |

*Primary Examiner*—Galen L. Barefoot
*Attorney, Agent, or Firm*—Pillsbury Madison & Sutro LLP

[57] ABSTRACT

This invention discloses an apparatus for stabilizing a payload assembly including a payload, a maintaining apparatus for at least temporarily maintaining the payload in an airborne environment, and an elongate connection apparatus, which when extended has a vertical length greatly in excess of the combined vertical lengths of the payload and the maintaining apparatus, whereby angular stabilization is a function of the vertical length of the connection apparatus when extended.

A method for stabilizing a payload assembly is also disclosed.

10 Claims, 13 Drawing Sheets

STABILIZING APPARATUS

FIELD OF THE INVENTION

The present invention relates to stabilizing apparatus in general and to stabilizing apparatus for airborne reconnaissance devices in particular.

BACKGROUND OF THE INVENTION

An early aerial photographic system described in U.S. Pat. No. 894,398, photographs the earth during free fall of the camera. The system is limited because the sharpness of the exposure depends on the shutter speed and no means is provided for stabilizing the camera against environmental effects such as wind perturbances.

U.S. Pat. No. 3,184,846 describes a camera which is stabilized by attaching it to a plurality of relatively short lengths of cable which are connected to a main suspension cable. This arrangement is inadequate for high resolution photography.

SUMMARY OF THE INVENTION

The present invention seeks to provide an aerial payload stabilizer which may be used, inter alia, for high resolution aerial photography and reconnaissance.

There is thus provided in accordance with a preferred embodiment of the present invention a stabilized payload assembly including a payload, maintaining apparatus for at least temporarily maintaining the payload in an airborne environment, and extensible elongate connection apparatus, which when extended has a vertical length greatly in excess of the combined vertical lengths of the payload and the maintaining apparatus, whereby angular stabilization is a function of the vertical length of the connection apparatus when extended.

Further in accordance with a preferred embodiment of the present invention, the payload, the maintaining apparatus and the extensible elongate connection apparatus are arranged initially to be in close proximity to each other in the airborne environment and to subsequently mutually distance themselves vertically as the extensible elongate connection apparatus is extended.

Still further in accordance with a preferred embodiment of the present invention, the angular velocity of the payload is an inverse function of the vertical length of the extensible elongate connection apparatus when extended.

Additionally in accordance with a preferred embodiment of the present invention, the payload comprises a reconnaissance apparatus, apparatus for rotating the reconnaissance apparatus about any of two mutually perpendicular axes of the reconnaissance apparatus and a controller for controlling the rotational position and velocity of the reconnaissance apparatus. The controller may comprise a compass and a rotation rate gauge.

There is also provided in accordance with a preferred embodiment of the present invention, a method of aerial reconnaissance including the steps of parachuting a reconnaissance apparatus, a maintaining apparatus and an extensible elongate connection apparatus, all initially arranged to be in close proximity to one another, stabilizing the reconnaissance apparatus by extending the extensible elongate connection apparatus and distancing the connection apparatus vertically from the maintaining apparatus, the reconnaissance apparatus being mounted on the connection apparatus, and acquiring information with the reconnaissance apparatus.

Further in accordance with a preferred embodiment of the present invention, the method further includes controlling the angular rotation of the reconnaissance apparatus about any of at least two mutually perpendicular axes of the reconnaissance apparatus.

Still further in accordance with a preferred embodiment of the present invention, the reconnaissance apparatus is a line scanner camera.

Additionally in accordance with a preferred embodiment of the present invention, the reconnaissance apparatus is an area camera.

Additionally in accordance with a preferred embodiment of the present invention, the reconnaissance apparatus is maintained at a specified spatial angular sector during reconnaissance.

Still further in accordance with a preferred embodiment of the invention, the maintaining apparatus is a balloon.

In accordance with another preferred embodiment of the present invention, the reconnaissance apparatus is sequentially moved to different specified spatial angular sectors during reconnaissance.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Figure 1:
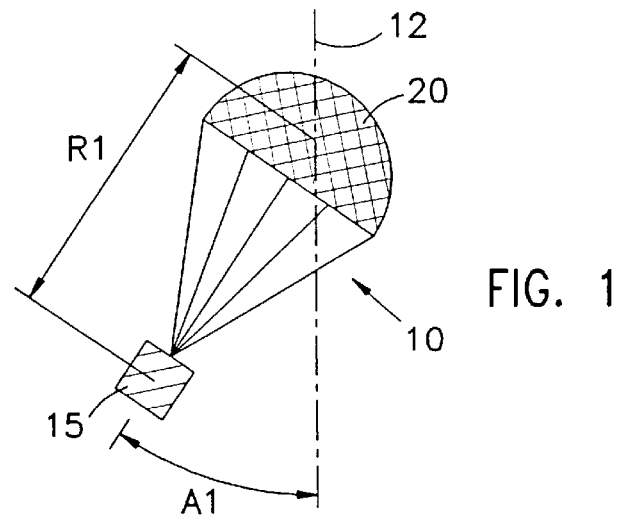
FIG. 1 is an illustration of an initially unstable state of a stabilized payload assembly constructed and operative in accordance with one preferred embodiment of the present invention in an initial orientation.
Figure 2:
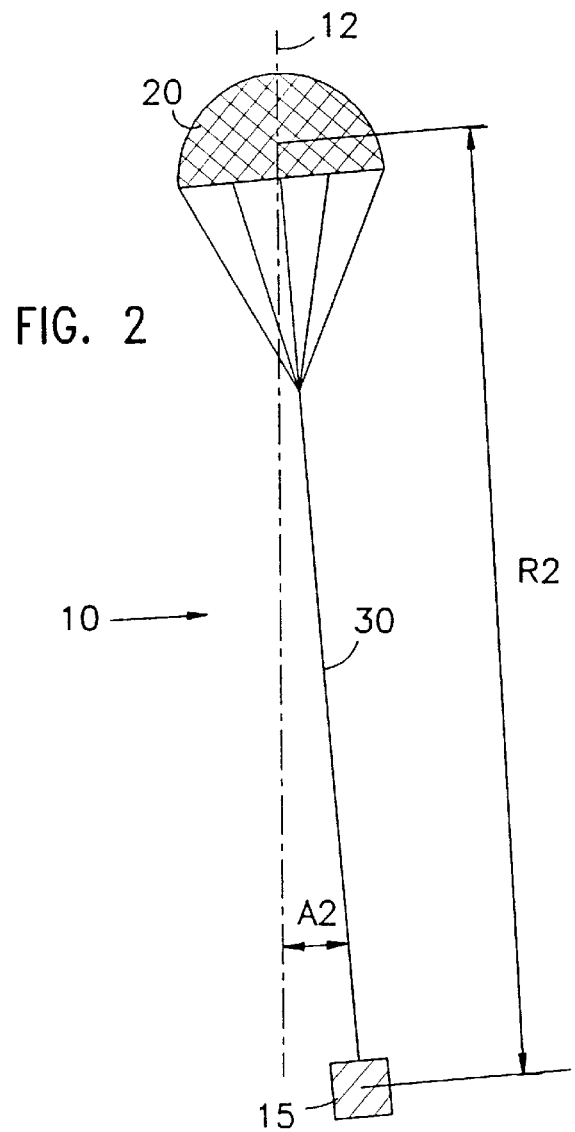
FIG. 2 is an illustration of the stabilized payload assembly shown in FIG. 1 during stabilization.
Figure 3:
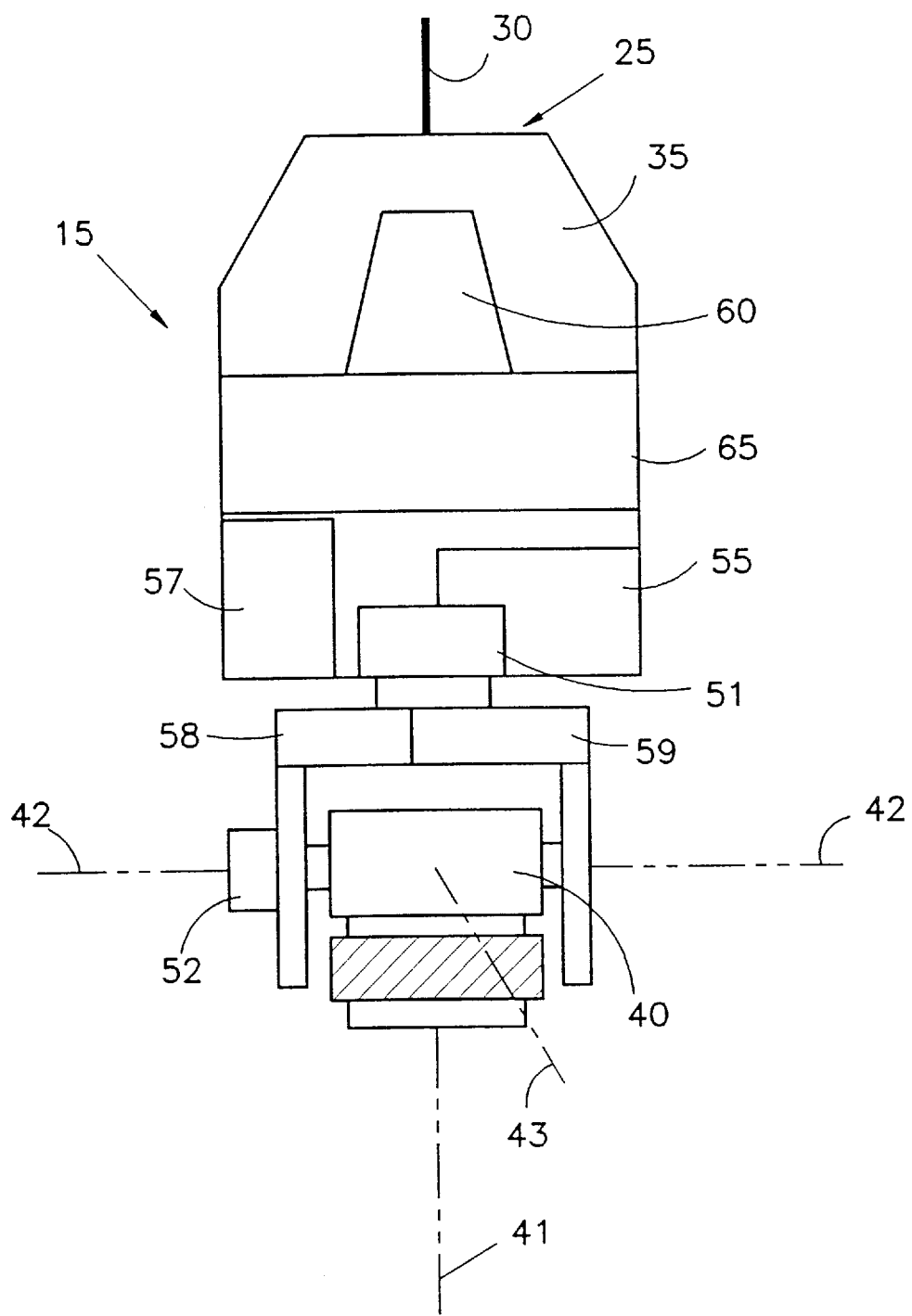
FIG. 3 is a simplified illustration of the components of the stabilized payload apparatus shown in FIGS. 1 and 2.

Reference is made to FIGS. 1–3 which illustrate a stabilized payload assembly 10 which comprises a payload 15, maintaining apparatus 20, preferably a parachute, and extensible elongate connection apparatus 25 which preferably comprises a cable 30 and a lowering spool 35, which is disposed at the lower end of cable 30.

It will be appreciated that the maintaining apparatus 20 may alternatively be a balloon or any other device that can at least temporarily maintain the payload assembly 10 in an airborne environment.

Initially upon deployment of stabilized payload assembly 10, as shown in FIG. 1, assembly 10 typically uncontrollably oscillates through a spatial angle A1 measured between a reference vertical axis 12 and a line connecting the center of pressure of the maintaining means and the center of gravity of payload 15. The radius of oscillation is designated as R1.

At a predetermined time, depending upon, for example, altitude, barometric conditions and mission requirements, the extensible elongate connection apparatus 25 is activated by any suitable means such as mechanical, electric or pyrotechnic, either directly or indirectly by remote control. Activation of extensible elongate connection apparatus 25 causes cable 30 to unwind from lowering spool 35, thereby greatly increasing radius R1 to R2 as shown in FIG. 2.

Neglecting vertical motion in the direction of axis 12 and considering only motion of the stabilizing payload assembly 10 in one plane, it will be appreciated that the motion of the stabilizing payload assembly is substantially that of a pendulum.

Letting

W1=initial angular oscillation velocity of payload 15;

W2=angular oscillation velocity of payload 15 after extension of extensible elongate connection apparatus;

R1=initial radius of oscillation of payload 15;

R2=radius of oscillation after extension;

it will be apparent that W1*R1 represents the maximum velocity of the center of gravity of the payload 15 as it oscillates in its initially deployed state as shown in FIG. 1. It will also be apparent that W2*R2 represents the maximum velocity of the payload 15 as it oscillates in its stabilizing state as shown in FIG. 2.

Conservation of energy dictates that the energy of stabilized payload assembly 10 in its initial state of FIG. 1 must equal the energy of stabilized payload assembly 10 in its stabilizing state of FIG. 2. Neglecting the mass of the maintaining apparatus 20, the mass of the extensible elongate connection apparatus 25, and neglecting all other external forces such as aerodynamic resistance, conservation of energy requires that $$W1*R1=W2*R2$$

It is seen that the angular oscillation velocity of the payload changes inversely with the radius of oscillation. In a preferred embodiment of the present invention, typically R1 is approximately 5 meters and W1 is approximately 30 degrees per second. Lowering the payload by typically about 50 meters, i.e., multiplying R1 by about 10, results in an angular oscillation velocity of the payload of only about 3 degrees per second.

The angles of oscillation before and after extension, respectively A1 and A2, are related to the radii of oscillation substantially as follows:

$$(R1/R2)=(\sin(A1/2)/\sin(A2/2))^2$$

Since for angles up to 30 degrees, the angle in radians is approximately equal to its sine, $(R1/R2)$ is approximately equal to $(A1/A2)^2$. Thus the angle of oscillation decreases as the inverse of the square root of the ratio of radii. In the typical example mentioned above, a lowering of the payload by 50 meters causes a decrease in the oscillation angle of about threefold, typically from about 20 degrees to about 6 degrees. If the payload is an aerial camera, the resultant stabilization leads to reduced blur commensurate with the reduction of the angular velocity.

It will also be apparent that any disturbance or perturbation in the motion of maintaining apparatus 20 caused by external forces such as a gust of wind, will be substantially reduced by the relatively long length of cable 30.

It will be appreciated that the analysis of motion of the maintaining apparatus 20 and the payload 15 presented hereinabove represents first order effects only and that the actual motion is considerably more complex. It is believed however that the overall motion of the maintaining apparatus 20 and payload 15 is substantially as described by the equations shown hereinabove.

Referring now to FIG. 3, in a preferred embodiment of the present invention, the payload 15 preferably comprises a camera 40 which is preferably a line scanner camera. The camera is preferably gimballed to allow rotation thereof about two mutually perpendicular axes. In the embodiment of FIG. 3, rotation is possible azimuthally about yaw axis 41 and elevationally about axis 42. It is appreciated that a gimbal (not shown) may also be constructed which allows further rotation about axis 43, which is mutually perpendicular to axes 41 and 42.

In a preferred embodiment of the present invention, rotation is accomplished by means of an azimuth motor 51 and an elevation motor 52. Typically the motors are servo-motors and along with camera 40 are controlled by a controller 55. Controller 55 preferably stabilizes the camera 40 about axis 41 in a closed loop control system. Controller 55 and motors 51 and 52 are preferably powered by a battery 57. The control loop preferably comprises a compass 58 and a rotation rate gauge 59. Alternatively, the camera 40 may be stabilized by controller 55 using a conventional gyroscope, rate gyro, or any other directional or angular velocity sensor, in the closed loop.

For certain reconnaissance requirements, the payload 15 may also comprise an antenna 60 and a transmitter 65. Alternatively, the transmitter may be substituted by a receiver (not shown) or transceiver (not shown) together with a central processing unit (not shown). Antenna 60 may also be controlled in a closed control loop in substantially the same manner as for camera 40.

It is appreciated that the stabilized payload assembly 10 suitable for use in aerial reconnaissance. The assembly 10 is typically parachuted from any type of aircraft such as an airplane or a rocket or is parachuted after being launched from any suitable launcher. Extensible elongate connection apparatus 25 is then extended to achieve stabilization of payload 15. Motors 51 and 52 in conjunction with controller 55 may be used to further stabilize the reconnaissance apparatus, such as camera 40 or antenna 60.

In one typical reconnaissance mission, the reconnaissance apparatus may be maintained at a specified spatial angular sector. Alternatively, the reconnaissance apparatus may be sequentially moved to different specified spatial angular sectors.

Figure 4:
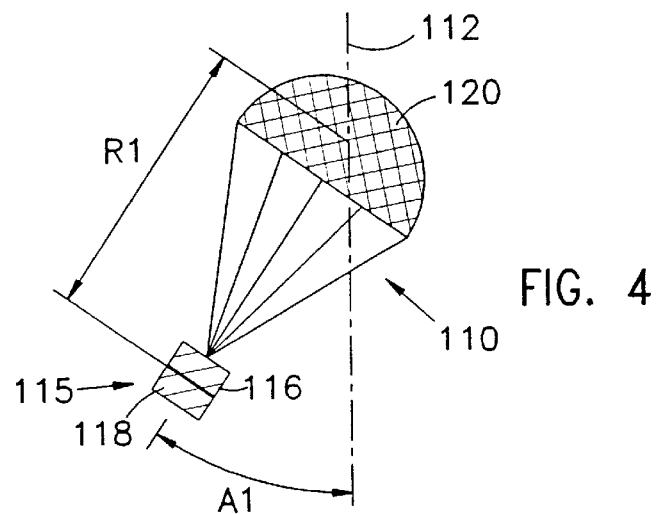
FIG. 4 is an illustration of an initially unstable state of a stabilized payload assembly constructed and operative in accordance with another preferred embodiment of the present invention in an initial orientation.
Figure 5:
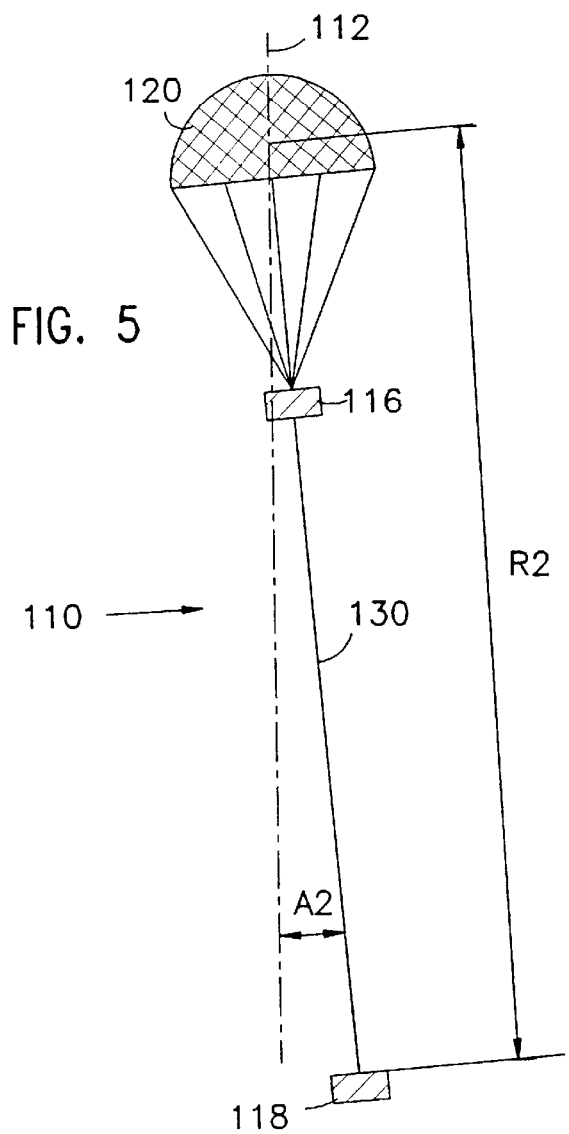
FIG. 5 is an illustration of the stabilized payload assembly shown in FIG. 4 during stabilization.
Figure 6:
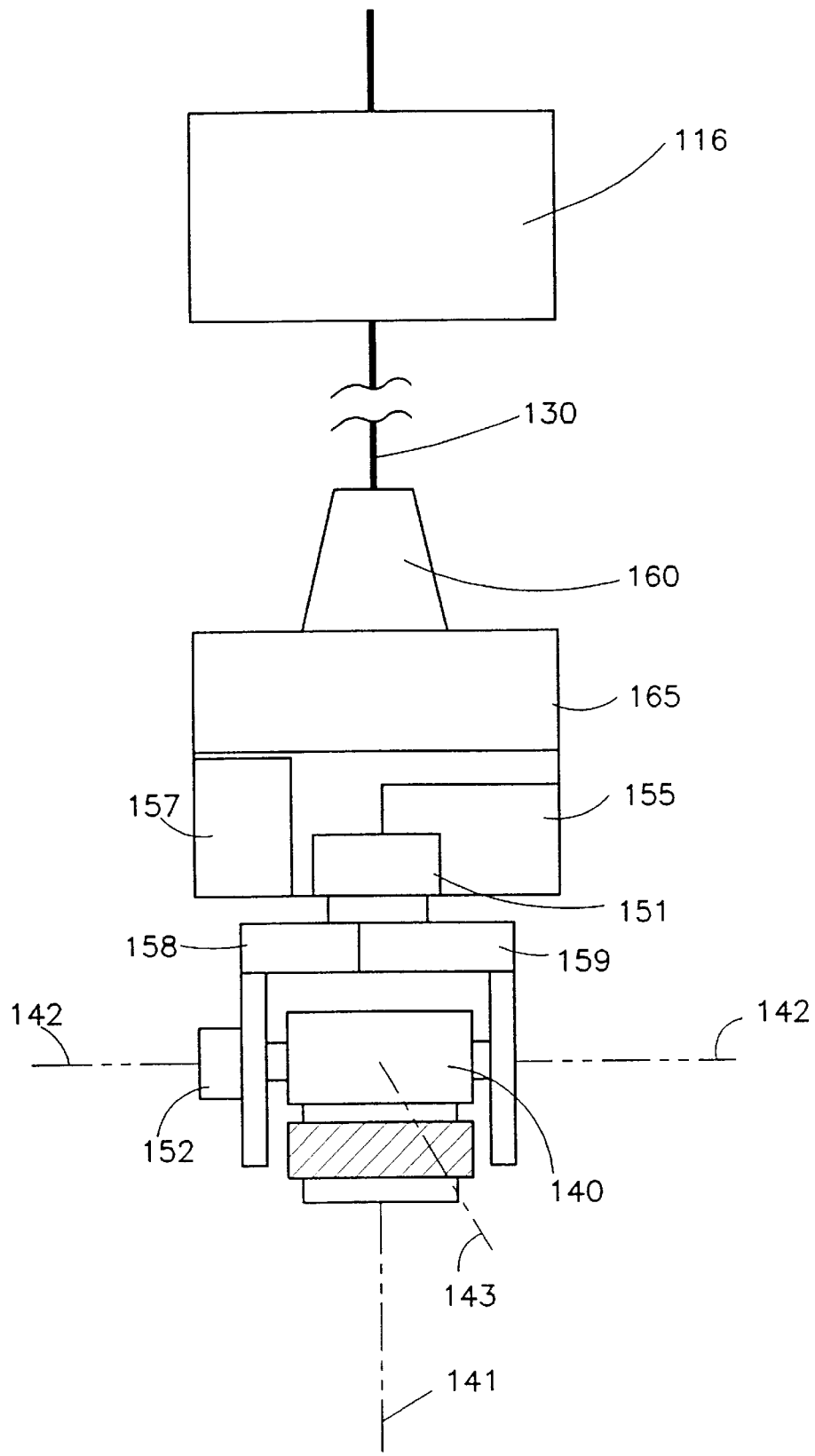
FIG. 6 is a simplified illustration of the components of the stabilized payload apparatus shown in FIGS. 4 and 5.

Reference is now made to FIGS. 4–6 which illustrate a stabilized payload assembly 110 constructed and operative in accordance with another preferred embodiment of the present invention. The embodiment of FIGS. 4–6 differs from that of FIGS. 1–3 in that the payload 115 preferably comprises a lowering spool 116 which is disposed at the top of cable 130. The remainder of the payload 115, designated in FIGS. 4 and 5 by reference numeral 118, may be identical to that shown in FIG. 3, identical or equivalent elements being represented in FIG. 6 by identical reference numerals with the addition of the prefix 1. The operation of the apparatus of FIGS. 4–6 may be substantially equivalent to that of the apparatus of FIGS. 1–3.

Figure 7:
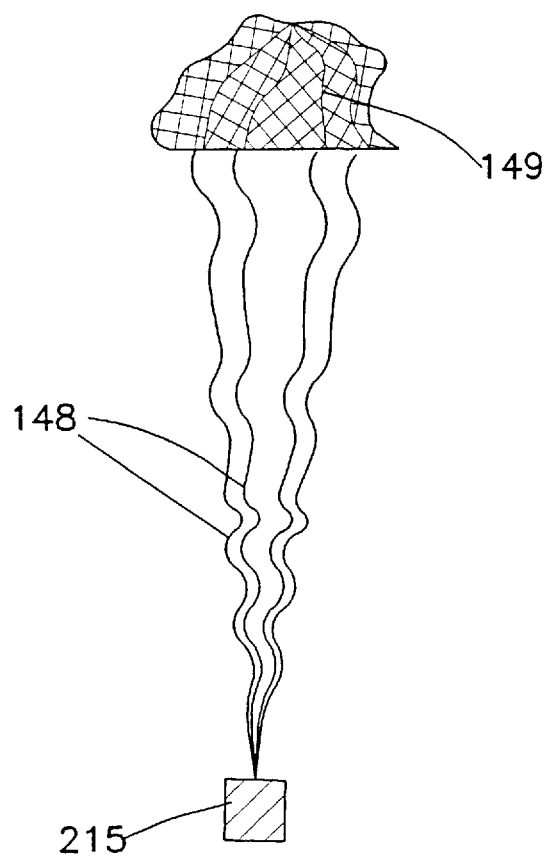
FIG. 7 is an illustration of an initially unstable state of a stabilized payload assembly constructed and operative in accordance with yet another preferred embodiment of the present invention in an initial orientation.
Figure 8:
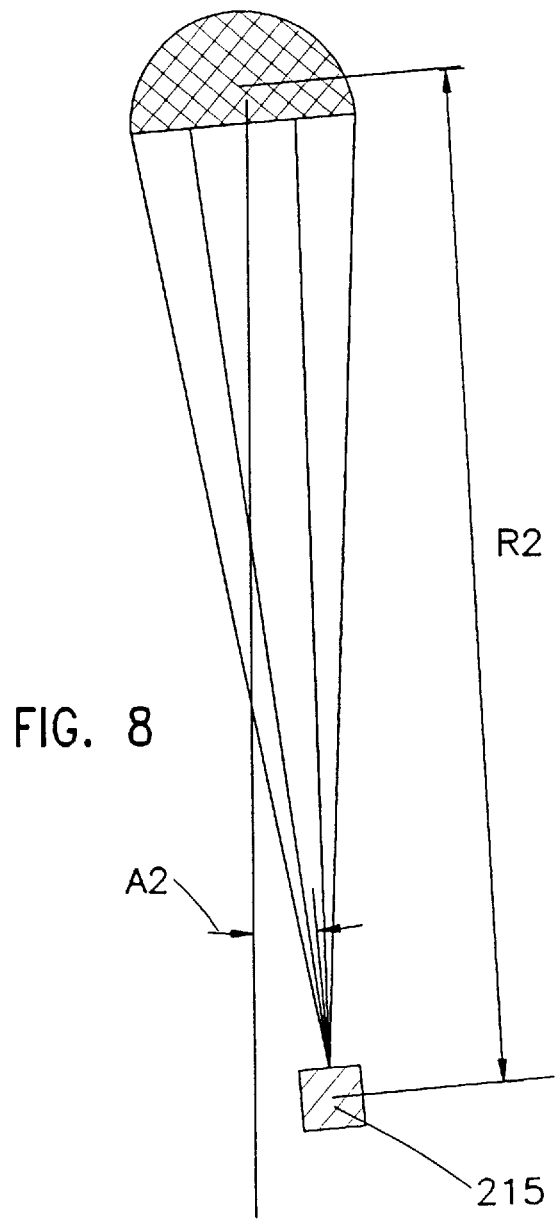
FIG. 8 is an illustration of the stabilized payload assembly shown in FIG. 7 during stabilization.
Figure 9:
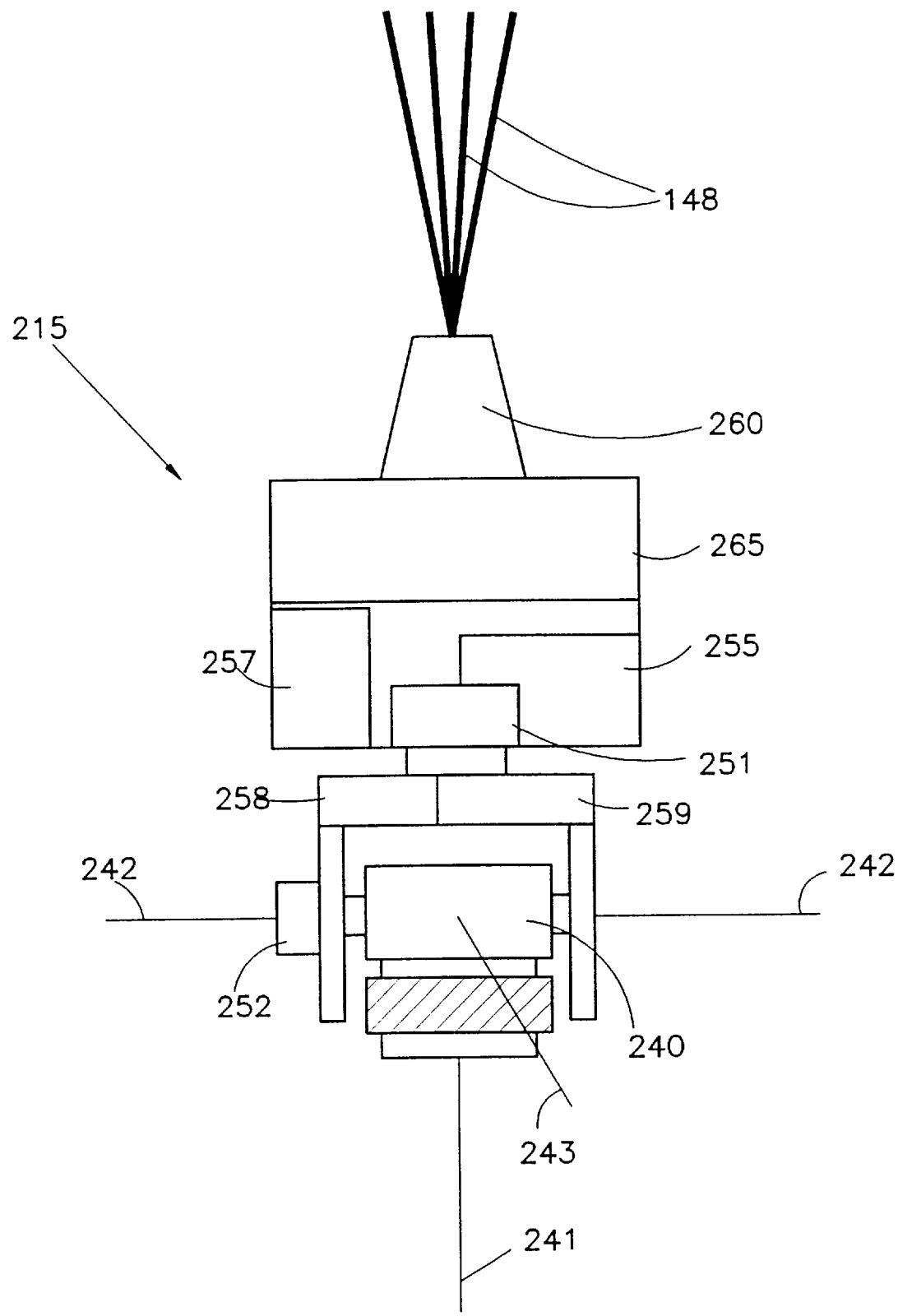
FIG. 9 is a simplified illustration of the components of the stabilized payload apparatus shown in FIGS. 7 and 8.

Reference is now made to FIGS. 7–9 which illustrate a stabilized payload assembly constructed and operative in accordance with yet another preferred embodiment of the present invention. The embodiment of FIGS. 7–9 differs from that of FIGS. 1–6 in that the extensible elongate connection apparatus comprises unusually long connection cables 148 directly connected to the parachute canopy 149. No unwinding spool is provided and after activation, the free fall of the payload 215 pulls the cables 148 taut as illustrated in FIG. 8. The payload 215 may be identical to that shown in FIG. 6, identical or equivalent elements being represented in FIG. 9 by identical reference numerals with the addition of the prefix 2. The operation of the apparatus of FIGS. 7–9 may be substantially equivalent to that of the apparatus of FIGS. 1–6, once the cables 148 are taut.

Figure 10:
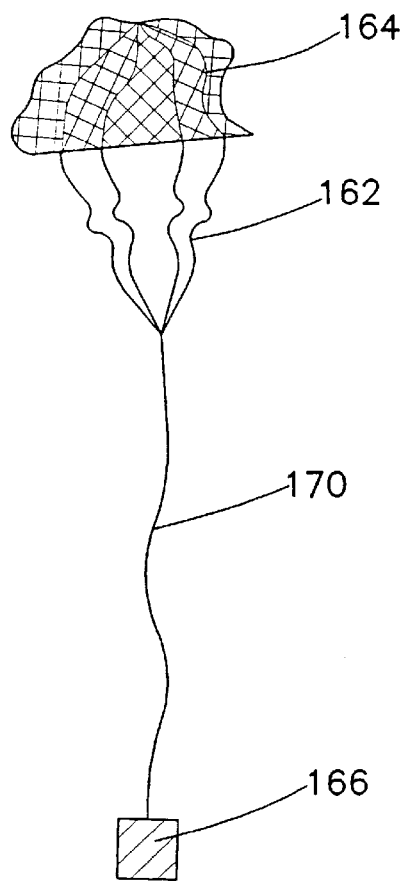
FIG. 10 is an illustration of an initially unstable state of a stabilized payload assembly constructed and operative in accordance with still another preferred embodiment of the present invention in an initial orientation.
Figure 11:
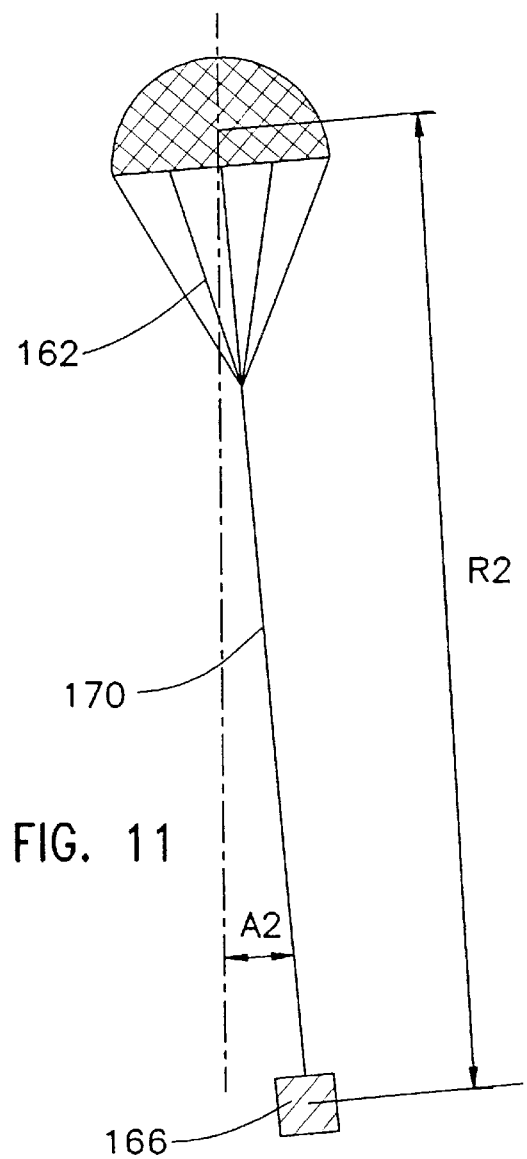
FIG. 11 is an illustration of the stabilized payload assembly shown in FIG. 10 during stabilization.
Figure 12:
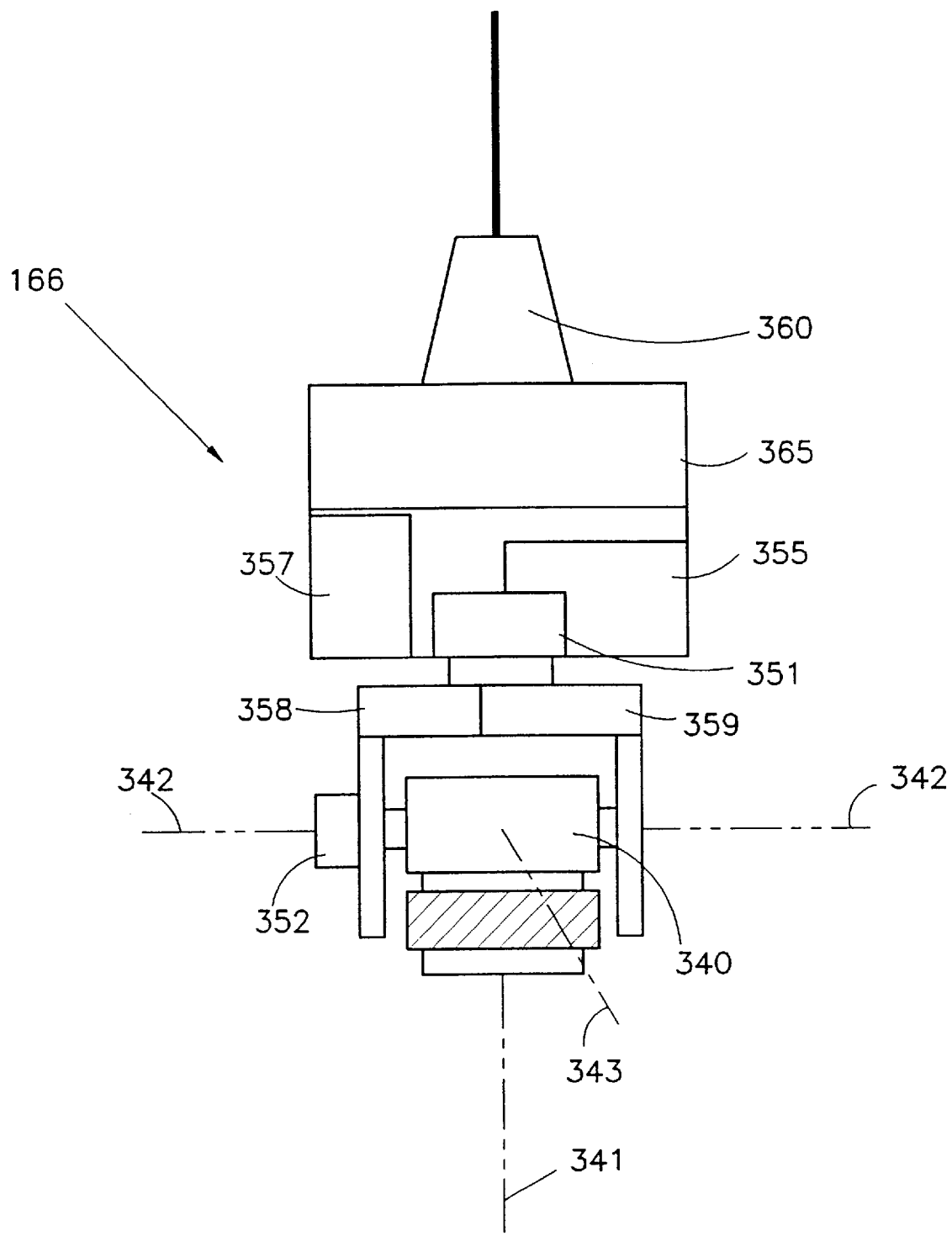
FIG. 12 is a simplified illustration of the components of the stabilized payload apparatus shown in FIGS. 10 and 11.

Reference is now made to FIGS. 10–12 which illustrate a stabilized payload assembly constructed and operative in accordance with still another preferred embodiment of the present invention. The embodiment of FIGS. 10–12 differs from that of FIGS. 7–9 in that the extensible elongate connection apparatus comprises a single long connection cable 170 directly connected to the conventional cables 162, which are conventionally associated with a parachute canopy 164.

As in the embodiment of FIGS. 7–9, no unwinding spool is provided and after activation, the free fall of a payload 166 pulls the cables 170 and 162 taut as illustrated in FIG. 11. The payload 166 may be identical to that shown in FIG. 9, identical or equivalent elements being represented in FIG. 12 by identical reference numerals with the addition of the prefix 3. The operation of the apparatus of FIGS. 10–12 may be substantially equivalent to that of the apparatus of FIGS. 1–9, once the cables 170 and 162 are taut.

Figure 13:
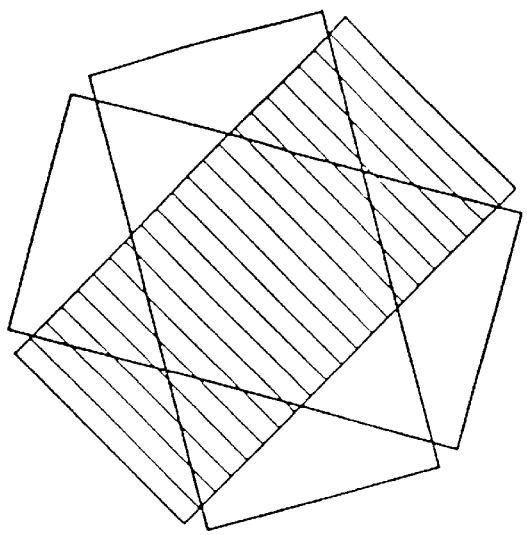
FIG. 13 is a simplified illustration of a multiple scan pattern provided in accordance with a preferred embodiment of the present invention.

Reference is now made to FIG. 13 which illustrates one scan pattern arrangement which can be achieved using the apparatus of the present invention. This pattern can be achieved, for example, by operation of elevation motor 52, and then by operation of azimuth motor 51, providing mutually opposed rotation of the upper and lower portions of the payload about axis 41. It will be apparent that other scan patterns similar to that of FIG. 13 may be obtained by operating azimuth motor 51 in different steps. Thus, for example, the scan pattern of FIG. 13 is obtained by rotating azimuth motor 51 in steps of 60 degrees.

The scan pattern of FIG. 13 may also be obtained by scanning once with elevation motor 52, rotating azimuth motor 51 60 degrees while returning the elevation motor 52 to its starting position, scanning again with elevation motor 52, rotating azimuth motor 51 by 60 degrees again while returning elevation motor 52 to its starting position again, scanning again with elevation motor 52 and then rotating azimuth motor 120 degrees in the opposite direction and returning the elevation motor 52 to its starting position.

Figure 14:
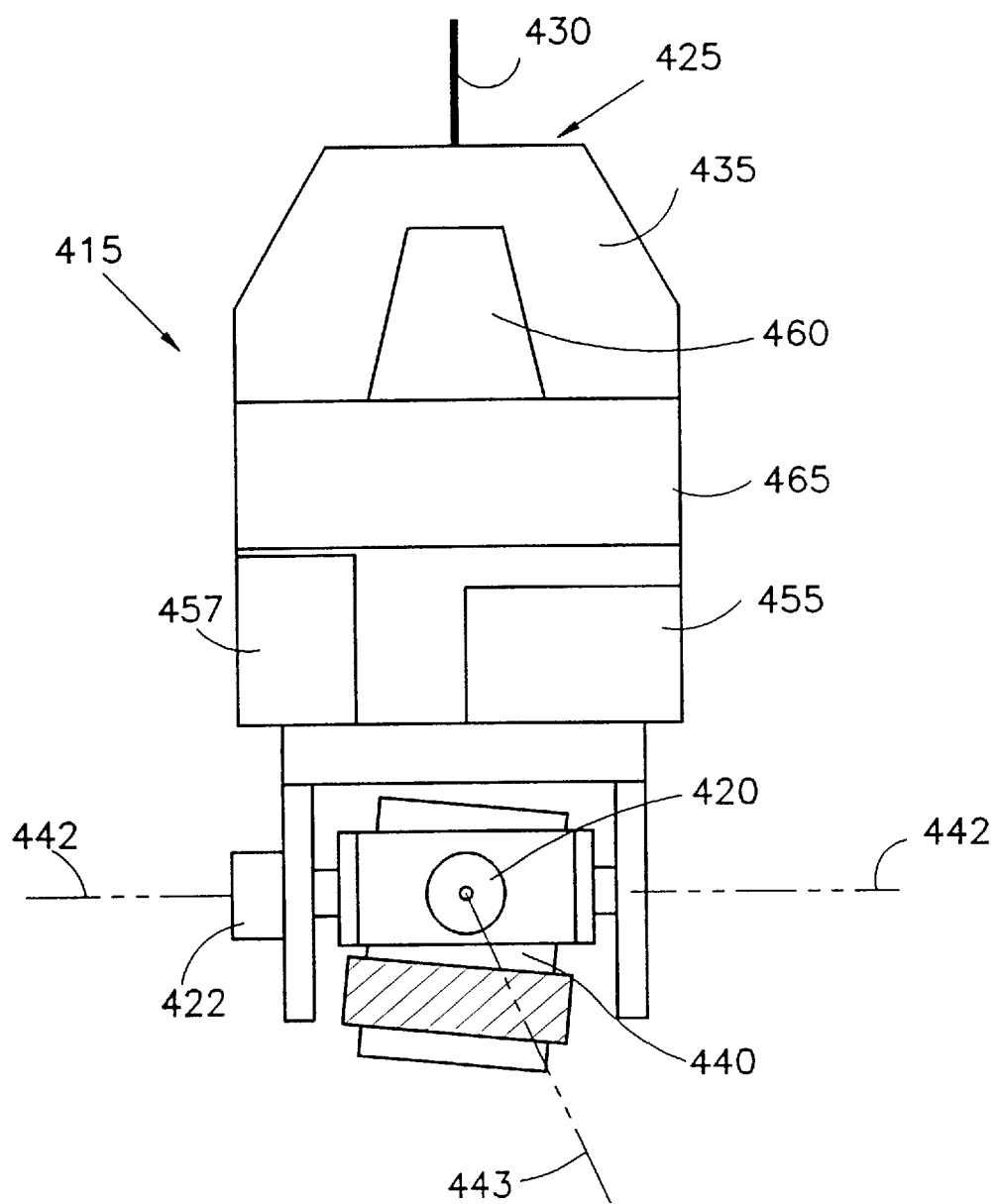
FIG. 14 is a simplified illustration of a the components of a stabilized payload apparatus constructed and operative in accordance with another preferred embodiment of the present invention.

FIG. 14 illustrates another embodiment of a stabilized payload assembly 415. The payload assembly 415 may be identical to that shown in FIGS. 1–12, identical or equivalent elements being represented in FIG. 14 by identical reference numerals with the addition of the prefix 4. The embodiment of FIG. 14 differs from the embodiment of FIG. 3 in that it provides rotation of the camera 440 about different gimbal axes 442 and 443. Elevation motor 422 and motor 420 providing control about the respective axes 442 and 443.

Figure 15:
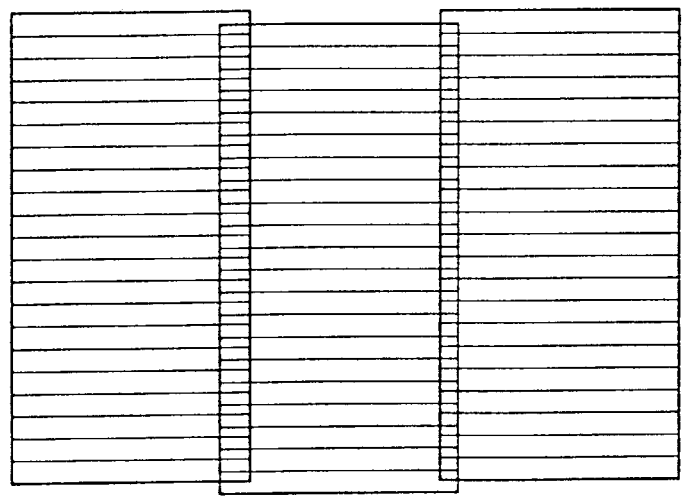
FIG. 15 is a simplified illustration of a multiple scan pattern provided in accordance with the embodiment of FIG. 14.

FIG. 15 illustrates one scan pattern arrangement which can be achieved using the embodiment shown in FIG. 14. The motor 420 is first operated to produce a rectangular shaped scan pattern. The elevation motor 422 is then operated to move to a different area whence motor 420 is again operated to produce another rectangular shaped scan pattern.

Figure 16:
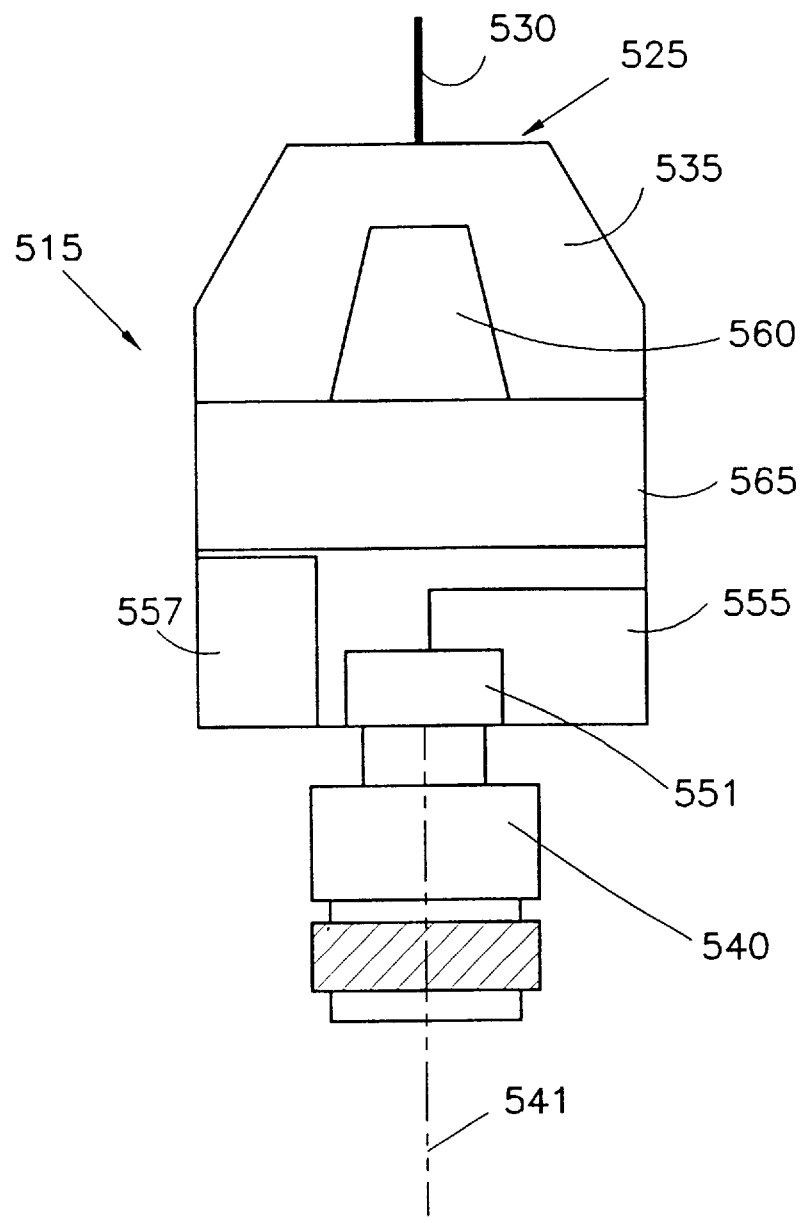
FIG. 16 is a simplified illustration of the components of a stabilized payload apparatus constructed and operative in accordance with still another preferred embodiment of the present invention.

Reference is now made to FIG. 16 which illustrates another embodiment of a stabilized payload assembly 515. The payload assembly 515 may be identical to that shown in FIG. 3, identical or equivalent elements being represented in FIG. 16 by identical reference numerals with the addition of the prefix 5. The apparatus of FIG. 16 differs from that of FIG. 3 in that the camera 540 is rotatable only about axis 541.

Figure 17:
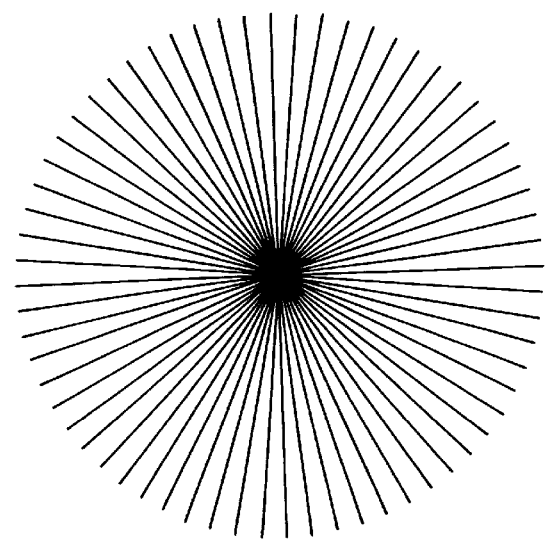
FIG. 17 is an illustration of a circular line scan pattern provided in accordance with the embodiment of FIG. 16.

FIG. 17 illustrates a scan pattern arrangement which can be achieved using the apparatus of FIG. 16. This pattern can be achieved by rotating the motor 551 about axis 541 in a sufficient number of substantially equal steps to cover the entire field. Typically, 16 or 32 such steps may be employed.

It will be apparent that the scan pattern arrangement of FIG. 17 may also be achieved by the apparatus shown in FIGS. 3 by rotating motor 51 about axis 41 in substantially equal steps to cover the entire field.

Figure 18:
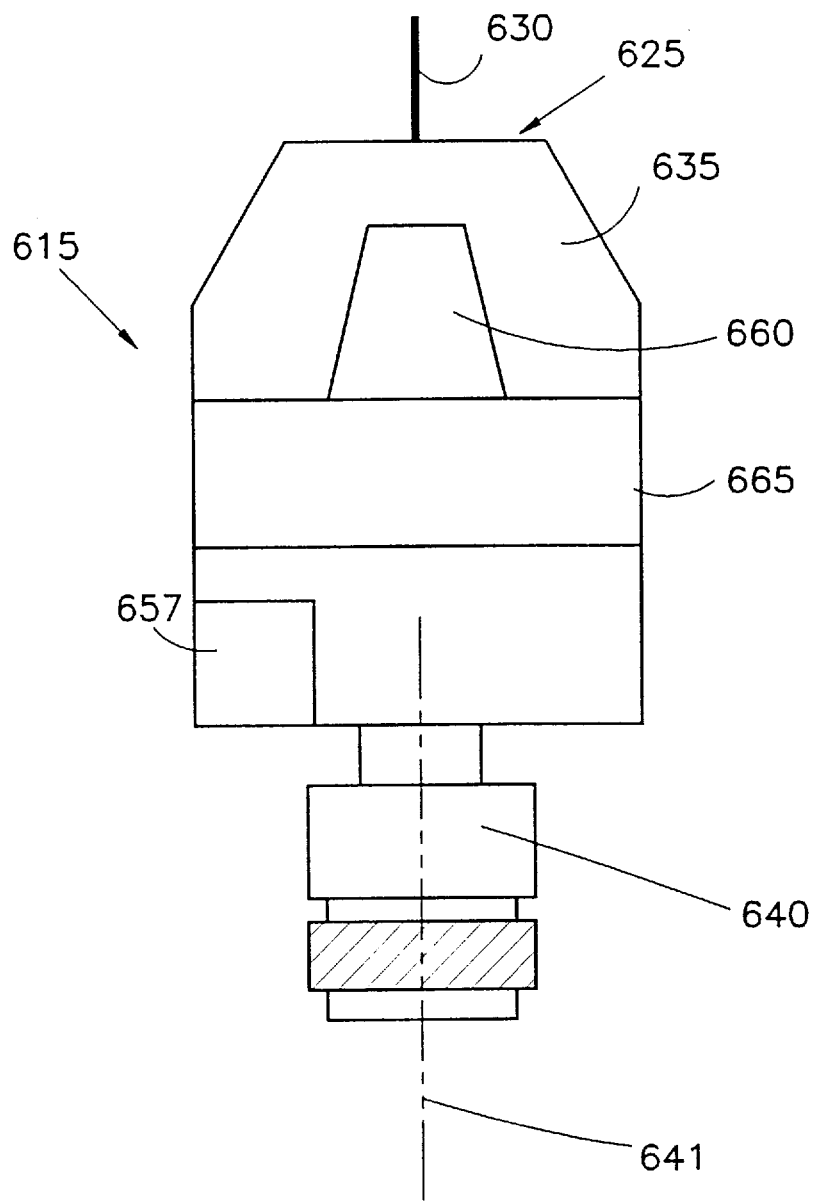
FIG. 18 is a simplified illustration of the components of a stabilized payload apparatus constructed and operative in accordance with yet another preferred embodiment of the present invention.

Reference is now made to FIG. 18 which shows another embodiment of a stabilized payload apparatus. The apparatus of FIG. 18 differs from that of FIG. 3 in that rotation of the payload about axis 641 is not actively stabilized by electronic means. The passive stabilization provided by the long length of cable 630 may provide a sufficiently stable platform for an array camera 640 to produce satisfactory pictures. It will be appreciated that the array camera 640 may be tilted with respect to axis 641 to increase the area covered by the array camera 640. It will also be apparent that any rotational motion about axis 641 caused by twisting of the long cable 630 will increase the area covered by the array camera 640.

Figure 19:
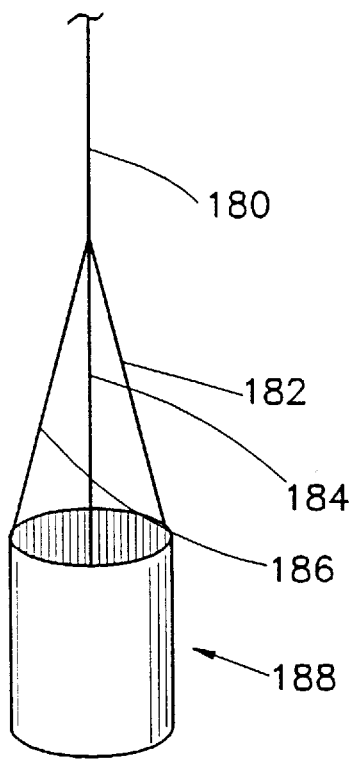
FIG. 19 illustrates part of the connection to the stabilized payload in accordance with one preferred embodiment of the present invention.
Figure 20:
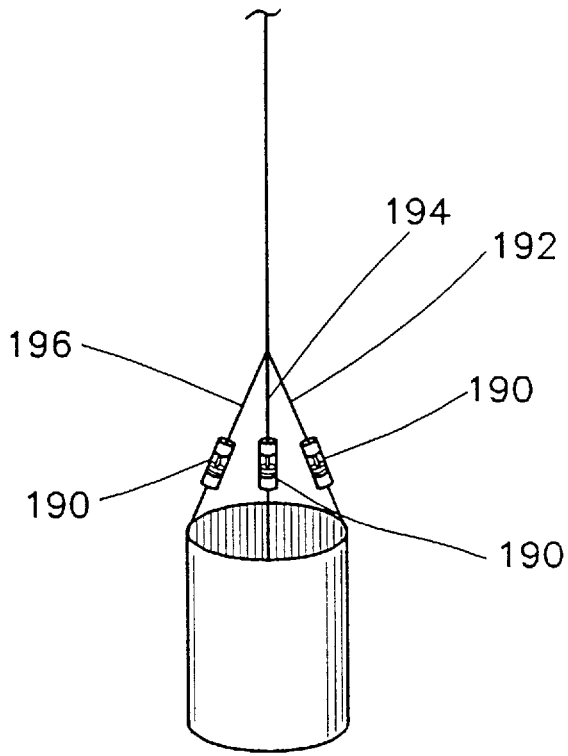
FIG. 20 illustrates part of the connection to the stabilized payload in accordance with another preferred embodiment of the present invention.
Figure 21:
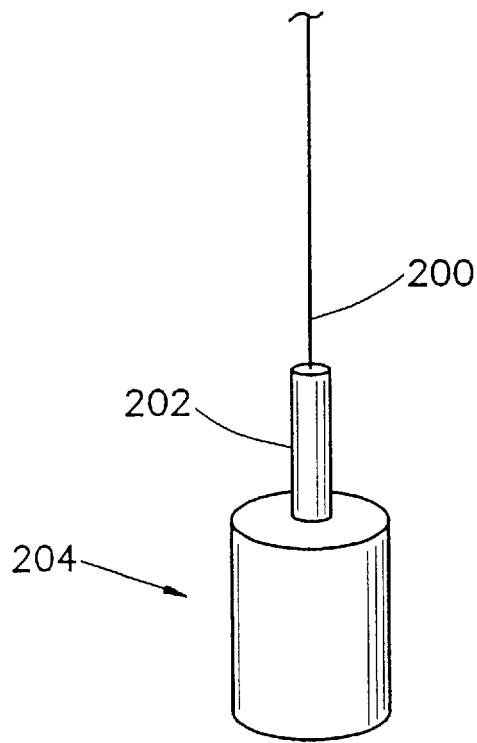
FIG. 21 illustrates part of the connection to the stabilized payload in accordance with yet another preferred embodiment of the present invention.

Reference is now made to FIGS. 19–21, which illustrate various mechanisms for joining the elongate connection apparatus to a payload. FIG. 19 shows a single cable 180 coupled typically via three attachment cables 182, 184 and 186 to three points on a payload 188, which points are mutually azimuthally separated, typically by 120 degrees.

FIG. 20 illustrates an embodiment similar to that of FIG. 19, wherein elongate axial energy absorbers 190 are arranged in series along each of typically three attachment cables 192, 194 and 196.

In both of the foregoing embodiments, the cables may be replaced by rods.

FIG. 21 illustrates an alternative embodiment of the invention wherein a connection cable 200 is coupled to a resilient, energy absorbing elongate connector 202, which is fixedly attached to a payload 204. The connector 202 is configured to reduce movement of the payload relative to the cable 200, by absorbing energy as it is deformed under load.

It will be appreciated by persons skilled in the art that the present invention is not limited to what has been particularly shown and described hereinabove. Rather, the scope of the present invention is defined only by the claims that follow:

We claim:

1. A stabilized payload assembly comprising:

a payload;

maintaining apparatus for at least temporarily maintaining said payload in an airborne environment; and elongate connection apparatus, which when extended has a vertical length greatly in excess of the combined vertical lengths of the payload and the maintaining apparatus, whereby angular stabilization is a function of the vertical length of the connection apparatus when extended and wherein the payload comprises a reconnaissance apparatus, apparatus for rotating said reconnaissance apparatus about any of at least two mutually perpendicular axes of said reconnaissance apparatus and a controller for controlling the rotational position and velocity of said reconnaissance apparatus and wherein the controller comprises a compass and a rotation rate gauge.

2. Apparatus according to claim 1 and wherein said reconnaissance apparatus is an array camera.

3. Apparatus according to claim 1 and wherein said reconnaissance apparatus is a line scanner camera.

4. Apparatus according to claim 1 and wherein said reconnaissance apparatus is an area camera.

5. Apparatus according to claim 1 and wherein said maintaining apparatus is a parachute.

6. A stabilized payload assembly comprising:

a payload;

maintaining apparatus for at least temporarily maintaining said payload in an airborne environment; and elongate connection apparatus, which when extended has a vertical length greatly in excess of the combined vertical lengths of the payload and the maintaining apparatus, whereby angular stabilization is a function of the vertical length of the connection apparatus when extended and wherein the payload comprises a reconnaissance apparatus, apparatus for rotating said reconnaissance apparatus about any of at least two mutually perpendicular axes of said reconnaissance apparatus and a controller for controlling the rotational position and velocity of said reconnaissance apparatus and wherein the controller comprises rotational stabilization apparatus which produces substantially zero yaw rotation.

7. Apparatus according to claim 1 and wherein said maintaining apparatus is a balloon.

8. Apparatus according to claim 6 and wherein said maintaining apparatus is a balloon.

9. Apparatus according to claim 6 and wherein said controller comprises at least one of the group gyroscope, rate gyro, angular velocity sensor and direction sensor.

10. Apparatus according to claim 6 and wherein said maintaining apparatus is a parachute.

* * * * *